CHARLES B. CARPENTER.

Improvement in Link-joints for Watch Chains.

No. 120,854. Patented Nov. 14, 1871.

120,854

UNITED STATES PATENT OFFICE.

CHARLES B. CARPENTER, OF NORTH ATTLEBOROUGH, MASSACHUSETTS.

IMPROVEMENT IN LINK-JOINTS FOR WATCH-CHAINS.

Specification forming part of Letters Patent No. 120,854, dated November 14, 1871.

*To all whom it may concern:*

Be it known that I, CHARLES B. CARPENTER, of North Attleborough, in the county of Bristol and State of Massachusetts, have invented an Improvement in Link-Joint for Watch-Chains; and I do hereby declare that the following is a full, clear, and exact description thereof, which will enable others skilled in the art to make and use the same, reference being had to the accompanying drawing forming part of this specification, in which—

Figure 1:
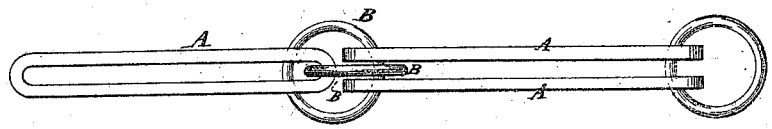
Figure 2:
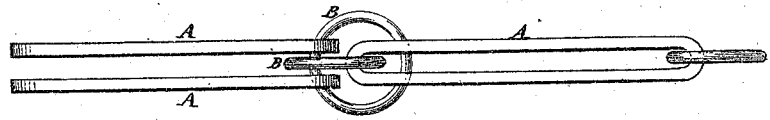

Figure 1 is a detail side view of a portion of a watch-chain illustrating my improved joint. Fig. 2 is a detail view of the same turned one-quarter around from the position shown in Fig. 1.

My invention has for its object to furnish an improved joint for connecting the links of watch-chains, watch-guards, &c., which shall be neat, strong, and durable, producing an elegant and substantial chain; and it consists in the joint formed by combining two rings with each other and with the ends of the adjacent links, as hereinafter more fully described.

A are the links, which are arranged in pairs and in such a way that the planes of the links of one pair may be at right angles with the planes of the links of the adjacent pair, as shown in Figs. 1 and 2. B are two rings, each of which is passed through the ends of the links A of one pair, and between the ends of the links of the adjacent pair, each ring passing around the part of the other ring that passes through the ends of the links, as shown in Figs. 1 and 2.

This construction gives the necessary flexibility to the chain and produces a chain strong, durable, and substantial, and, at the same time, neat and elegant in appearance.

Having thus described my invention, I claim as new and desire to secure by Letters Patent—

An improved joint for watch-chains, formed by the combination of two rings B with each other and with the adjacent ends of two pairs of links A, substantially in the manner herein shown and described, and for the purpose set forth.

CHARLES B. CARPENTER.

Witnesses:
 THOMAS A. BARDEN,
 EMERSON E. JOHNSON. (86)